J. A. BLAKE & S. L. MARSDEN.
Ore-Crushers.
No. 149,711. Patented April 14, 1874.
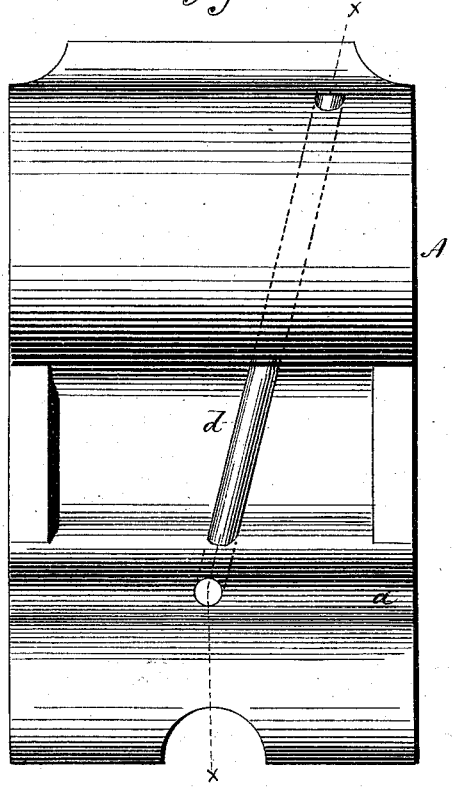
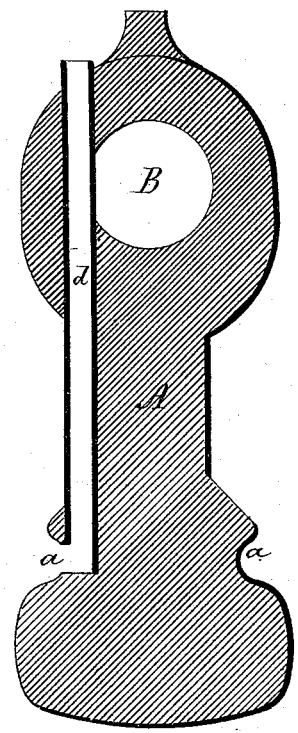

UNITED STATES PATENT OFFICE.

JOHN A. BLAKE AND SAMUEL L. MARSDEN, OF NEW HAVEN, CONNECTICUT, ASSIGNORS TO THE BLAKE CRUSHER COMPANY, OF SAME PLACE.

IMPROVEMENT IN ORE-CRUSHERS.

Specification forming part of Letters Patent No. 149,711, dated April 14, 1874; application filed April 2, 1874.

*To all whom it may concern:*

Be it known that we, JOHN A. BLAKE and SAMUEL L. MARSDEN, of New Haven, in the county of New Haven and State of Connecticut, have invented a new Improvement in Stone-Breaker; and we do hereby declare the following, when taken in connection with the accompanying drawings and the letters of reference marked thereon, to be a full, clear, and exact description of the same, and which said drawings constitute part of this specification, and represent, in—

Figure 1, a side view of the pitman, and in Fig. 2 a section on line *x x*.

This invention relates to an improvement in what is known as the "Blake Stone-Crusher;" the object being to afford a means for lubricating the bearings of the toggle on the pitman. These bearings are so far inclosed in the machine as to make it difficult and almost impossible to lubricate them, and the result is that they wear very rapidly. The invention whereby this difficulty is overcome consists in the introduction of a tubular passage leading from the upper end of the pitman down to the seats.

A is the pitman, connected by its upper end B to the mechanism which imparts to it a reciprocating movement. Near the lower end is the seat *a* for the toggle, one upon each side. One end of each part of the toggle lies in these seats, and the vertical movement of the pitman imparts the crushing movement to the parts. These seats are so far down within the machine, and the space each side of the pitman is so small, that it is with very great difficulty that lubrication can be introduced to these seats, and the result is that this part of the machine is neglected, and as the strain at this point is very great a corresponding wear occurs, so that without proper lubrication the machine frequently requires repairs at these points.

To overcome this difficulty we form a passage, *d*, leading from the upper end of the pitman down, and opening into the seats, as seen in Fig. 2, so that oil introduced into these passages at the top will run down to and lubricate the seats. The best method of forming these passages is to introduce a tube into the mold preparatory to casting, then pour the metal, which closes around the tube, leaving it as seen in the drawings. This prevents the unavoidable saturation of the casting when the tube is not used, excepting at the seats.

We claim as our invention—

The pitman A for a stone-crusher, formed with seats *a*, and having combined therewith the passage *d*, leading from the upper end of the pitman down to the seats, substantially as described.

JOHN A. BLAKE.
S. L. MARSDEN.

Witnesses:
GEO. A. BLAKE,
GEO. SHERMAN.